United States Patent
Blatz et al.

(10) Patent No.: US 6,842,493 B2
(45) Date of Patent: Jan. 11, 2005

(54) PROCEDURE FOR INCREASING THE MANIPULATION SECURITY FOR A BI-DIRECTIONAL CONTACTLESS DATA TRANSMISSION

(75) Inventors: Werner Blatz, Leingarten (DE); Marco Schwarzmueller, Heilbronn (DE)

(73) Assignee: Atmel Germany GmbH, Heilbronn (DE)

(*) Notice: Subject to any disclaimer, the term of this patent is extended or adjusted under 35 U.S.C. 154(b) by 655 days.

(21) Appl. No.: 09/734,632

(22) Filed: Dec. 11, 2000

(65) Prior Publication Data
US 2001/0014117 A1 Aug. 16, 2001

(30) Foreign Application Priority Data
Feb. 8, 2000 (DE) .......................... 100 05 503

(51) Int. Cl.[7] ............... H04L 27/20; H04G 9/00
(52) U.S. Cl. .................. 375/295; 342/42; 340/5.1; 340/5.62
(58) Field of Search .................... 340/5.1–5.92; 375/295, 316, 224; 380/247–250, 38; 379/142.05; 455/411

(56) References Cited

U.S. PATENT DOCUMENTS

| | | | | |
|---|---|---|---|---|
| 4,229,741 A | * | 10/1980 | Groth, Jr. .................. 370/294 |
| 4,364,043 A | * | 12/1982 | Cole et al. ............... 340/10.34 |
| 4,630,044 A | * | 12/1986 | Polzer .................. 340/825.72 |
| 5,193,114 A | * | 3/1993 | Moseley ..................... 713/183 |
| 5,504,485 A | | 4/1996 | Landt et al. ................. 342/42 |
| 5,723,911 A | * | 3/1998 | Glehr ......................... 340/10.5 |
| 5,838,074 A | * | 11/1998 | Loeffler et al. ............ 340/5.61 |
| 5,862,225 A | * | 1/1999 | Feldman et al. ............ 380/274 |

FOREIGN PATENT DOCUMENTS

| | | |
|---|---|---|
| DE | 3820353 | 12/1989 |
| DE | 3928571 | 3/1990 |
| DE | 4020445 | 1/1992 |
| DE | 4213880 | 4/1993 |
| DE | 4205827 | 9/1993 |
| DE | 19827722 | 12/1999 |

OTHER PUBLICATIONS

"Ein Vielseitig Einsetzbares Schlüssellosses Zentral–Verriegelungsystem" (A Keyless Central Locking System With Varied Applications), published by VDI, Germany, VDI Report No. 1415, by Schmitz et al., 1998; pgs. 259 to 279.

* cited by examiner

Primary Examiner—Chieh M. Fan
Assistant Examiner—Jason M. Perilla
(74) Attorney, Agent, or Firm—W. F. Fasse; W. G. Fasse

(57) ABSTRACT

In a bi-directional contactless data transmission, a procedure aims to prevent the communication distance from being extended by unauthorized persons using radio repeaters. The procedure involves establishing a fixed relationship of a selected physical parameter of an electromagnetic signal. For example, the frequency of the signal received by a transponder is multiplied with a number to provide a different frequency, and a response signal having this different frequency is transmitted back to a base unit. In the base unit, the received frequency of this response signal is divided by the same number and the result is compared to the frequency of the originally emitted signal. If the resulting difference is below a preset threshold, then there is a fixed frequency relationship between the two signals, the process concludes that there has been no unauthorized extension of the communication distance by using repeaters, and the further authentication is carried out.

22 Claims, 1 Drawing Sheet

PROCEDURE FOR INCREASING THE MANIPULATION SECURITY FOR A BI-DIRECTIONAL CONTACTLESS DATA TRANSMISSION

BACKGROUND

1. Field of the Invention

The subject invention concerns a procedure for increasing the manipulation security for a bi-directional contactless data transmission by means of a first transmission and receiver unit (BA) and a second transmission and receiver unit.

2. Description of the Related Technology

Systems for bi-directional contactless data transmission are preferably used for identification systems. These consist of a transponder, which is either integrated in a key fob or a so-called Smart card, and a stationary base unit. In vehicle engineering—one of the principal areas of application for transponder technology, the base unit is fitted into vehicles. The communication between transponder and base unit is based on an inductive coupling, with generally either the unidirectional or the bi-directional protocol being used for communication between transponder and base unit. The complete identification process for the transponder or base units is designated as authentication. If the transponder does not have its own power supply, or if this is empty, it will obtain its energy from the LF field emitted by the base unit. In these cases, the data transmission range will be restricted to just a few centimeters. In other cases, the range is determined by security requirements and system limitations. Inasmuch as a particularly high level of security is demanded with regard to identification—for example when obtaining so-called "passive entry", i.e. when opening the vehicle by pulling on the door handle,—the communication distance will be limited to 2.5 m when using the bi-directional protocol. To this end, preferably a LF carrier frequency of 125 kHz is used for the communication between motor vehicle and key, whilst for the communication from key to motor vehicle a carrier frequency is used which is preferably within the UHF range of 433.92 MHz. In the case of reduced security requirements, such as e.g. for active opening by pressing the key switch when being in the vicinity of the motor car, a range of up to 30 m is permitted. To this end, the unidirectional protocol will generally be used in connection with a UHF carrier frequency near 433.92 MHz. The greater security of the bi-directional protocol during the authentication process is that in comparison to the unidirectional protocol—which only provides for a single authorization check of the transponder—the base unit will also be authenticated. For all applications in transponder technology, it is important that the time required for the authentication process is kept as short as possible. In particular in motor vehicle engineering, the entire time period taken for authentication should not exceed 130 ms. Due to the high security requirements, a bi-directional protocol is used as a matter of preference. In order to further increase manipulation security, in particular for the bi-directional protocol, new solutions are being searched for.

With the present state of the art, as described for instance in VDI Report No. 1415, 1998, an authentication with a bi-directional protocol will be effected according to the following pattern:

As soon as the transponder has been activated by means of an activation command sent out by a base unit, e.g. by operating the door handle on the motor vehicle, an authentication can be effected by means of a mutual identification check. To this end, random numbers—so-called "Challenges"—will be exchanged, from which, in the transponder as well as in the base unit, a permanently programmed algorithm will calculate numbers that are designated as a response. Then the calculated response between transponder and base unit will be replaced again and checked for agreement with the user calculated response. If these checks are positive for the transponder as well as the base units, authentication is successful. The data sequences exchanged for identification will be modulated onto the UHF carrier frequency. The carrier frequency will be generated by means of a quartz. The precision of the latter will typically be ±100 ppm; relative to the carrier frequency of 433.92 MHz, this corresponds to a precision of ±43.392 KHz. As both the transponder as well as the base unit operate with their own frequency stabilization, and as even the respective exciter circuits for the quartzes feature a frequency imprecision, the input bandwidth in the respective receiver unit is designed for approximately 300–600 kHz in order to ensure stable communications.

Due to the significant bandwidth of the input filters, however, it is possible to provide for an additional extension of the communication distance between transponder and base unit, using suitable aids, without any interference in the authentication process for a bi-directional protocol. But as the extension allows distances to be bridged that are significantly greater than 2.5 m, a manipulation cannot be excluded either. To this end, the signals emitted from the base unit and the transponder will be forwarded by means of two trade standard repeaters, such that one repeater will be located in the vicinity of the base unit whilst the other repeater is located in the vicinity of the transponder. In order to avoid feedback, both repeaters mix the signals emitted at e.g. 433.92 MHz onto another frequency band. The minor frequency shift which occurs will not be noticeable due to the relatively wide input filters. Depending on the transmission power of the repeater, great distances can be bridged in this way in order to obtain within the shortest possible time (130 ms) quite unnoticed unauthorized access—to a motor vehicle, for instance. In order to close this significant security gap during authentication on the basis of a bi-directional data transmission, solutions need to be found by means of which any unintended extension of the communication distance will be detected.

SUMMARY OF THE INVENTION

It is the task of the invention described here to state a low cost procedure which, for a bi-directional contactless data transmission, makes any unintended extension of the communication distance between the base unit and the transponder significantly more difficult, and thus offers significantly increased security against manipulation. However, this should not lead to any increase in total authentication time.

In accordance with the invention, this task is solved in a procedure to increase the manipulation security for a bi-directional contactless data transmission by means of a first transmission and receiver unit and a second transmission and receiver unit, wherein:

the second transmission and receiver unit, on receipt of a transmitted electromagnetic signal from the first transmission and receiver unit, will convert this signal, with regard to at least one selected physical quantity that characterizes the signal, into a response signal and re-transmit the response signal to the first transmission and receiver unit, on receipt of the response signal, the first transmission and receiver unit will convert this response signal with regard to the selected physical quantity thereof into a test signal such that this will compensate the conversion effected in the second transmission and receiver unit, in the first transmission and receiver unit a comparison between the test signal and the transmitted electromagnetic signal is effected, and as a result of this comparison a value is assigned to a manipulation indication.

Investigations carried out by the applicant have shown that the manipulation security of the transponder base unit system can be increased significantly, if, in the case of a bi-directional communication between transponder and base unit, the value of at least one of the physical quantities from the electromagnetic signals used for information exchange purposes is changed reversibly. To this end, an electromagnetic signal will be emitted from a transmitter unit, for instance the transmitter unit included in the base unit. For this electromagnetic signal which is then received by the transponder, the value of one of the physical quantities characterizing the signal will then be changed; and then the changed electromagnetic signal will be returned to the base unit. In the base unit, this value will subsequently be changed back. By means of a comparison, i.e. comparing the reversibly changed value of the physical quantity with its original value, it will then be possible to check whether the deviation of this physical quantity is within an expected tolerance range. With regard to the existing authentication process according to the bi-directional protocol, which only contains a comparison of numeric values (response) calculated from random numbers, the additional comparison of values allows any non-permissible extension of the communication distance between transponder and base unit to be detected. The precision of the procedure is proportionate to the size of the time window which is used for the comparison of the reversibly changed value with the original value of the physical quantity.

According to a first embodiment it has been found to be particularly advantageous if, as a physical quantity whose value is changed reversibly, the frequency of the electromagnetic waves is used. This is implemented by generating a UHF carrier frequency—at 433.92 MHz for instance—in the base unit and transmitting the same to the transponder. Additionally, a data signal can be modulated onto this carrier frequency. In the transponder, the data signal will then be separated for further evaluation and, finally, the received UHF carrier frequency will be converted to a different frequency range. Following the possible modulation with a data signal, the changed carrier frequency will be retransmitted to the base unit. In the base unit, after re-conversion to the original carrier frequency, a frequency comparison with the previously emitted carrier frequency will be effected. If, within the time window under consideration, the frequency shift determined in this way is smaller than a preset value, an unauthorized extension of the communication distance can be excluded. Depending on the application, this check can be effected either in parallel or in series to the calculation of the response numbers from the exchanged random numbers (challenge). The authentication of the transponder and base unit system will only be positive if the results of all individual checks are positive. In this connection, it has been found that the entire authentication process should be completed within 300 ms at most.

BRIEF DESCRIPTION OF THE DRAWING

In the following, the invention will be illustrated and elucidated in accordance with a drawing. The figure shows.

DESCRIPTION OF THE PREFERRED EMBODIMENTS

Figure 1:
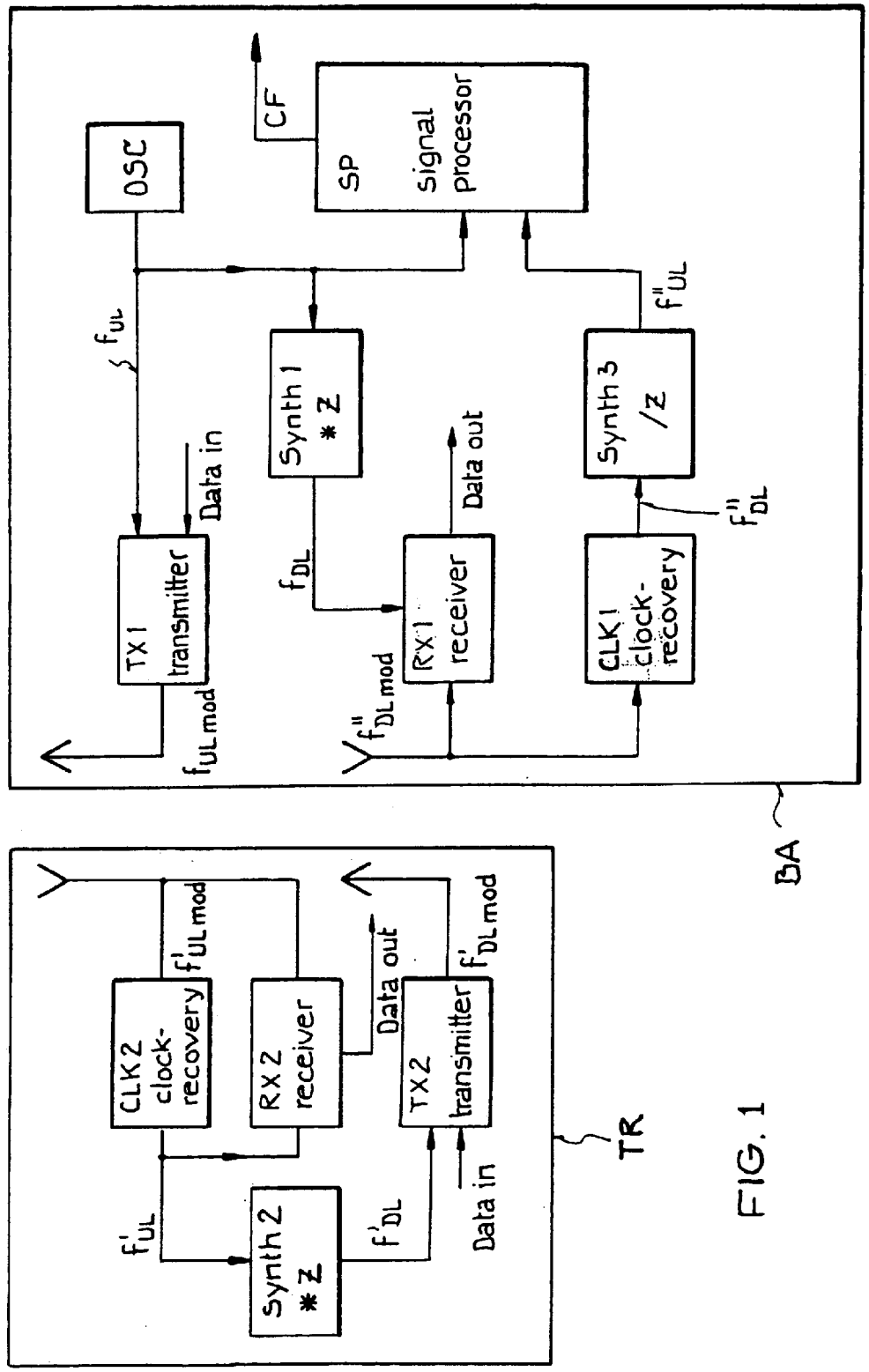
FIG. 1 An embodiment of the invention as a procedure for checking a fixed frequency relationship in the case of a bi-directional data transmission.

FIG. 1 shows an embodiment of the procedure an accordance with the invention. As shown here, in the base unit BA, the carrier frequency fUL generated by an oscillator OSC will be modulated by the transmitter TX1 with a data signal. The signal fULmod generated in this way will be emitted by the transmitter TX1. In the transponder TR, the frequency f'UL is generated from the received signal f'ULmod by means of the frequency regeneration unit CLK2. Together with the signal f'UL generated in this way, and the input signal f'ULmod, the data signal modulated onto the carrier frequency will be regained in the receiver RX2. From the frequency f'UL the frequency f'DL is generated, using the synthesizer Synth2, by multiplying the frequency f'UL with the number Z. Investigations of the applicant have shown that it is particularly advantageous if the number Z is built up from a ratio of two natural numbers. In the transmitter TX2, the transmission data will be modulated onto the signal, followed by the generation and emission of the signal f'DLmod from the frequency f'DL. In the base unit BA, the transponder data are regained from the received signal f"DLmod by means of the receiver unit RX1. To this end, the receiver unit RX1 will be fed with the frequency fDL generated, using the synthesizer Synth1, by multiplying the frequency fUL with the number Z. Furthermore, the frequency f"DL is generated from the received signal f"DLmod by means of the frequency regeneration unit CLK1. Using the synthesizer Synth3, the frequency f"UL is generated from the frequency f"DL by dividing the same by the number Z. Using the signal processor SP, the difference of the two frequencies fUL and f"UL is calculated and compared with a preset limit or threshold value over a time period t to provide an output signal CF. If the difference between the two frequencies fUL and f"UL is below the preset limit value, this is taken as an indication that there was no unauthorized extension of the communication distance between the transponder and the base unit. Starting from a time window of e.g. 20 ms, it is thus possible to detect reliably frequency shifts of 1 ppm; at 433.92 MHz this shift is 433 Hz. This value is thus smaller by a factor 100 than the value provided by the previous state of the art.

Other than in the embodiment of the procedure according to this invention shown in FIG. 1, where the authentication has been effected respectively by a transponder and a base unit each, the procedure can also be used for authentication in the case of several transponders or base units. In the same way, a transponder may be selected as a starting point for the emission of an electromagnetic signal.

What is claimed is:

1. Procedure to increase the manipulation security for a bi-directional contactless data transmission by means of a first transmission and receiver unit (BA) and a second transmission and receiver unit (TR)

wherein the second transmission and receiver unit (TR), on receipt of a transmitted electromagnetic signal (fULmod) from the first transmission and receiver unit (BA) as a received electromagnetic signal, will process the received electromagnetic signal, including conversion with regard to at least one selected physical quantity that characterizes the signal and modulation with data to form a response signal (f'DLmod) and re-transmit the response signal to the first transmission and receiver unit (BA), and on receipt of the response signal (f"DLmod), the first transmission and receiver unit (BA) will convert this response signal with regard to the selected physical quantity thereof into a test signal (f"UL) such that this will compensate the conversion effected in the second transmission and receiver unit (TR), and in the first transmission and receiver unit (BA) a comparison between the test signal (f"UL) and the transmitted electromagnetic signal (fUL) is effected, and as a result (CF) of the comparison a value is assigned to a manipulation indication.

2. Procedure according to claim 1 wherein it is investigated for the comparison within a time period t, whether there is a fixed relationship with regard to the selected physical quantity.

3. Procedure according to claim 1 wherein, if the result (CF) of the comparison is below a selected limit value, the manipulation indication is assigned a value 0.

4. Procedure according to claim 1 wherein the comparison (SP) will be completed within a period t1 of 300 ms max. following the transmission of the transmitted electromagnetic signal (fULmod).

5. Procedure according to claim 1 wherein as a physical quantity for the comparison (SP) the phase, amplitude, or frequency of the test signal is used.

6. Procedure according to claim 1, wherein said modulation with data comprises frequency or amplitude modulation.

7. Procedure according to claim 1 wherein the comparison is effected only by means of the frequency of each of the electromagnetic signal and the response signal (fUL, f'UL).

8. Procedure according to claim 1 wherein, in the second transmission and receiver unit (TR), the frequency of the received electromagnetic signal (f'UL) is multiplied with a number (Z), and, in the first transmission and receiver unit (BA), the frequency of the received response signal (f"DL) is divided by this number (Z).

9. Procedure according to claim 8 wherein the multiplication and division is effected by means of a ratio made up of two natural numbers.

10. Procedure according to claim 7 wherein, if the result (CF) of the frequency comparison is below a selected limit value, the manipulation indication is assigned a value 0.

11. Procedure according to claim 8 wherein, if the result (CF) of the frequency comparison is below a selected limit value, the manipulation indication is assigned a value 0.

12. A method of carrying out a bi-directional contactless data transmission with increased security between a first unit and a second unit, comprising the steps:

a) emitting from said first unit a forward signal having an original value of a characteristic physical parameter selected from the group consisting of a frequency, a phase, and an amplitude;

b) receiving said forward signal in said second unit;

c) determining a received value of said characteristic physical parameter of said forward signal as received in said second unit;

d) modifying said received value of said characteristic physical parameter according to a defined first modification to produce a modified value of said characteristic physical parameter;

e) generating and emitting from said second unit a response signal having said modified value of said characteristic physical parameter wherein the step of generating includes modulating with data;

f) receiving said response signal in said first unit;

g) determining a returned value of said characteristic physical parameter of said response signal as received in said first unit;

h) modifying said returned value of said characteristic physical parameter according to a defined second modification to produce a resultant value of said characteristic physical parameter;

i) comparing said resultant value to said original value of said characteristic physical parameter to determine a difference therebetween; and j) responsive to and dependent on said difference, determining whether to block the data transmission between said first and second units.

13. The method according to claim 12, wherein said characteristic physical parameter is said frequency.

14. The method according to claim 13, wherein said difference between said resultant value and said original value of said frequency is detected down to a frequency difference of 1 ppm.

15. The method according to claim 12, wherein said characteristic physical parameter is said phase.

16. The method according to claim 12, wherein said characteristic physical parameter is said amplitude.

17. The method according to claim 12, wherein said second modification reverses said first modification.

18. The method according to claim 17, wherein said first modification comprises multiplication, and said second modification comprises division.

19. The method according to claim 12, wherein said first modification consists of multiplication by a factor, said second modification consists of division by said factor, said step of modifying said received value consists of multiplying said received value by said factor, and said step of modifying said returned value consists of dividing said returned value by said factor.

20. The method according to claim 12, wherein said step of comparing said resultant value to said original value comprises generating a test signal having said resultant value of said characteristic physical parameter, and comparing said test signal to said forward signal with respect to said characteristic physical parameter.

21. The method according to claim 12, wherein said determining whether to block the data transmission comprises blocking the data transmission if said difference exceeds a predetermined threshold.

22. The method according to claim 12, wherein said data comprises an authorization code, and further comprising recovering and comparing said authorization code with a validation code in said first unit to determine whether to permit the data transmission between said first and second units.

* * * * *